(12) United States Patent
Bender et al.

(10) Patent No.: US 7,010,806 B2
(45) Date of Patent: Mar. 7, 2006

(54) DYNAMIC DOWNLOADING OF KEYBOARD KEYCODE DATA TO A NETWORKED CLIENT

(75) Inventors: Michael S. Bender, Boulder Creek, CA (US); Fabio Pistolesi, Biviers (FR)

(73) Assignee: Sun Microsystems, Inc., Santa Clara, CA (US)

( * ) Notice: Subject to any disclaimer, the term of this patent is extended or adjusted under 35 U.S.C. 154(b) by 789 days.

(21) Appl. No.: 09/861,024

(22) Filed: May 18, 2001

(65) Prior Publication Data
US 2002/0184526 A1    Dec. 5, 2002

(51) Int. Cl.
*H04L 9/32* (2006.01)

(52) U.S. Cl. .......................................... 726/4; 380/277

(58) Field of Classification Search ................. 713/201
See application file for complete search history.

(56) References Cited

U.S. PATENT DOCUMENTS

| | | | | |
|---|---|---|---|---|
| 4,903,218 A | * | 2/1990 | Longo et al. ............... | 715/759 |
| 6,257,486 B1 | * | 7/2001 | Teicher et al. .............. | 235/380 |
| 6,275,874 B1 | * | 8/2001 | Wilson .......................... | 710/8 |
| 6,615,264 B1 | * | 9/2003 | Stoltz et al. ................ | 709/227 |

* cited by examiner

*Primary Examiner*—Matthew Smithers
(74) *Attorney, Agent, or Firm*—Martine Penilla & Gencarella LLP (57) ABSTRACT

The present invention is directed toward dynamic downloading of keyboard keycode data to a networked client. According to one or more embodiments of the present invention, a user logs into a networked client by presenting a smart card to a card reader attached to the client (or by some other authentication mechanism) and enters a PIN into the keyboard. The keycodes entered by the user logging into the client are obtained, translated into ASCII characters, and presented to the smart card. If the PIN is correct, the user is able to log in, otherwise the log in fails. In one embodiment, when the user enters the PIN, a translation table is downloaded from the server into the client. The client uses the translation table to convert the keycodes to ASCII text and presents the ASCII text to the smart card for authentication.

5 Claims, 10 Drawing Sheets

FIG. 9: HID

FIG. 10:
HID Single Chip Implementation

DYNAMIC DOWNLOADING OF KEYBOARD KEYCODE DATA TO A NETWORKED CLIENT

BACKGROUND OF THE INVENTION

1. Field of the Invention

The present invention relates to network security. More specifically, the invention relates to the dynamic downloading of keyboard keycode data to a networked client.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

When logging into a distributed network of computing devices, it is typical for a security measure to be in place which helps to insure the identity of the individual logging in. One instance where this occurs is on a system that uses a smart card. The user inserts the card into a card reading device attached to the computing system and enters a personal identification number (PIN) onto a keyboard, keypad, or other input device of the computing system. If the PIN number is authenticated then the user logs in and begins using the distributed network.

As will be further explained below, the manner in which the PIN number is currently authenticated is vulnerable to snooping attacks from entrusted third parties that night use the PIN to compromise the network. Before further describing the problems associated with current techniques which authenticate PINs, an example computing environment where this problem occurs is described below.

Multi-Tier Application Architecture

In the multi-tier application architecture, a client communicates requests to a server for data, software and services, for example, and the server responds to the requests. The server's response may entail communication with a database management system for the storage and retrieval of data. The multi-tier architecture includes at least a database tier that includes a database server, an application tier that includes an application server and application logic (i.e., software application programs, functions, etc.), and a client tier. The application server responds to application requests received from the client. The application server forwards data requests to the database server.

Figure 1:
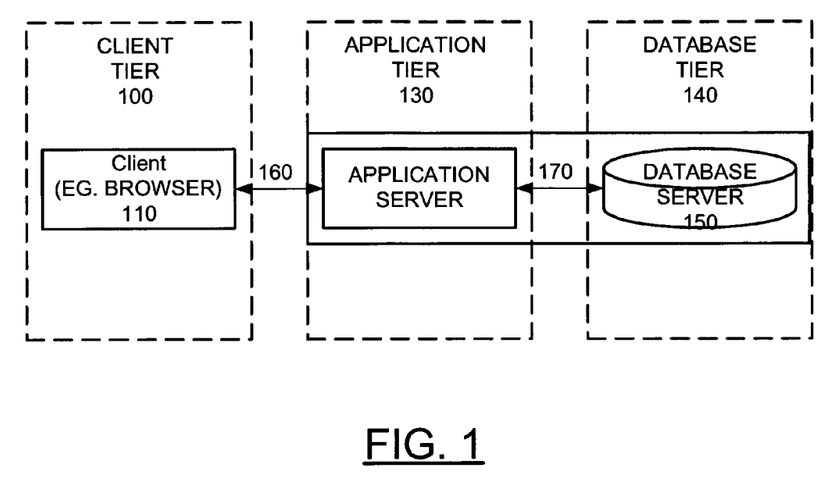
FIG. 1 shows an example of a multi-tier application architecture.

FIG. 1 provides an overview of a multi-tier architecture. Client tier 100 typically consists of a computer system that provides a graphic user interface (GUI) generated by a client 110, such as a browser or other user interface application. Conventional browsers include Internet Explorer and Netscape Navigator™, among others. Client 110 generates a display from, for example, a specification of GUI elements (e.g., a file containing input, form, and text elements defined using the Hypertext Markup Language (HTML)) and/or from an applet (i.e., a program such as a program written using the Java™ programming language, or other platform independent programming language, that runs when it is loaded by the browser).

Further application functionality is provided by application logic managed by application server 120 in application tier 130. The apportionment of application functionality between client tier 100 and application tier 130 is dependent upon whether a "thin client" or "thick client" topology is desired. In a thin client topology, the client tier (i.e., the end user's computer) is used primarily to display output and obtain input, while the computing takes place in other tiers. A thick client topology, on the other hand, uses a more conventional general purpose computer having processing, memory, and data storage abilities. Database tier 140 contains the data that is accessed by the application logic in application tier 130. Database server 150 manages the data, its structure and the operations that can be performed on the data and/or its structure.

Application server 120 can include applications such as a corporation's scheduling, accounting, personnel and payroll applications, for example. Application server 120 manages requests for the applications that are stored therein. Application server 120 can also manage the storage and dissemination of production versions of application logic. Database server 150 manages the database(s) that manage data for applications. Database server 150 responds to requests to access the scheduling, accounting, personnel and payroll applications' data, for example.

Connection 160 is used to transmit data between client tier 100 and application tier 130, and may also be used to transfer the application logic to client tier 100. The client tier can communicate with the application tier via, for example, a Remote Method Invocator (RMI) application programming interface (API) available from Sun Microsystems™. The RMI API provides the ability to invoke methods, or software modules, that reside on another computer system. Parameters are packaged and unpackaged for transmittal to and from the client tier. Connection 170 between application server 120 and database server 150 represents the transmission of requests for data and the responses to such requests from applications that reside in application server 120.

Elements of the client tier, application tier and database tier (e.g., client 110, application server 120 and database server 150) may execute within a single computer. However, in a typical system, elements of the client tier, application tier and database tier may execute within separate computers interconnected over a network such as a LAN (local area network) or WAN (wide area network).

Security Measures

Smart cards are used in environments like the multi-tier application architecture as a security measure to insure the identity of the user when he/she logs into a computing device on the client tier. Once identified, data on the database tier and applications on the application tier may be used. One advantage associated with using a smart card or other identification technique is that no matter where the computing device is located on the client tier, the same data and applications that the user needs, or was using before his/her last log-off, can be retrieved.

Smart cards are useful for securely storing secret information and embedding cryptographic algorithms for use in a cryptographic system. In many cases, the smart card requires the presentation of a secret that only the cardholder knows. Sometimes this secret is called a PIN. Since the smart card itself has no mechanism for interacting with a human being (i.e., no keyboard or display), it requires the system it is being used with to provide the human I/O facilities to prompt the cardholder for a PIN and to accept the cardholder's input of the PIN, typically on a keyboard or other suitable input device.

As the PIN is being entered on the keyboard, it is vulnerable to a snooping attack where an entrusted third party might be able to access the PIN and compromise it. In particular, when a key is pressed on a keyboard, the keyboard sends a code that represents the location of the key in a keyboard matrix. To obtain an ASCII representation of that key, the keycode is applied to a translation table that translates keycodes into ASCII characters. When such a keyboard is connected to a networked client, the keycodes are typically not processed in the client, but are sent via the network to a server. The server performs the necessary translations and passes the translated codes to the applications.

In cases where the keyboard translation is part of a secure process (i.e., a PIN code entry, the keyboard codes are vulnerable to an interception attack at two points—on their way from the client to the server and on their way back from the server to the client. Moreover, since the keyboard codes of the PIN are resident on the server, at least for the time required to send those codes back to the client system, the PIN is vulnerable to a snooping attack while it is on the server.

One solution is to provide a smart card reader with a built in keypad used to enter the PIN. This avoids the danger of snooping that might occur when the PIN is authenticated via a server on the distributed network. This solution, however, is disadvantageous because it requires expensive and dedicated hardware to authenticate the PIN.

SUMMARY OF THE INVENTION

The present invention is directed toward dynamic downloading of keyboard keycode data to a networked client. According to one or more embodiments of the present invention, a user logs into a networked client by presenting a smart card to a card reader attached to the client (or by some other authentication mechanism) and enters a PIN into the keyboard. The keycodes entered by the user logging into the client are obtained, translated into ASCII characters, and presented to the smart card. If the PIN is correct, the user is able to log in, otherwise the log in fails. The process occurs completely on the client and thereby avoids the danger associated with snooping the keycodes when they are sent over the network to the server for translation and then sent back over the network to the client for processing.

In one embodiment, when the user enters the PIN, a client generates a request to a server for a translation table by sending the server information about the configuration of the keyboard connected to it. In response, the server accesses a database to obtain the appropriate translation table and downloads it from the server into the client. The client uses the translation table to convert the keycodes to ASCII text and presents the ASCII text to the smart card for authentication. In one embodiment, the server provides the client wit a list and a range of valid keycodes that the client should process since not all keycodes are of interest to the client.

In another embodiment, a set of special keycodes are specified by the server in the keyboard translation table sent from the server to the client. The special keyboards include, for instance, "end of input", "delete previous character", and "abort operation". When one of the special codes is generated by the keyboard, the client performs special processing such as deleting a character in a buffer or returning a special status code to the server to indicate that the current user input processing should be terminated.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention relates to the dynamic downloading of keyboard keycode data to a networked client. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Dynamic Downloading of Keyboard Keycodes

A keycode is entered every time a key on a keyboard is pressed. Moreover, each keyboard has a different configuration. For instance, a keyboard in China is configured differently than an English or German keyboard. Typically, network computers do not include the state necessary to understand what type of keyboard they are connected to. Instead, the raw keycodes are obtained when the key is pressed and they are sent over the network to a server that applies the keycodes to a translation table so it can determine the actual character that corresponds to the location on the type of keyboard connected to the network computer (client). In this process, there is a danger of interception of the keycodes when they are traveling over the network According to one or more embodiments of the present invention, the danger of interception is avoided as follows: a user logs into a networked client by presenting a smart card to a card reader attached to the client (or by some other authentication mechanism) and enters a PIN into the keyboard. The keycodes entered by the user logging into the client are obtained, translated into ASCII characters, and presented to the smart card. If the PIN is correct, the user is able to log in, otherwise the log in fails. The process occurs completely on the client and thereby avoids the danger associated with snooping the keycodes when they are sent over the network to the server for translation and then sent back over the network to the client for processing.

Figure 2:
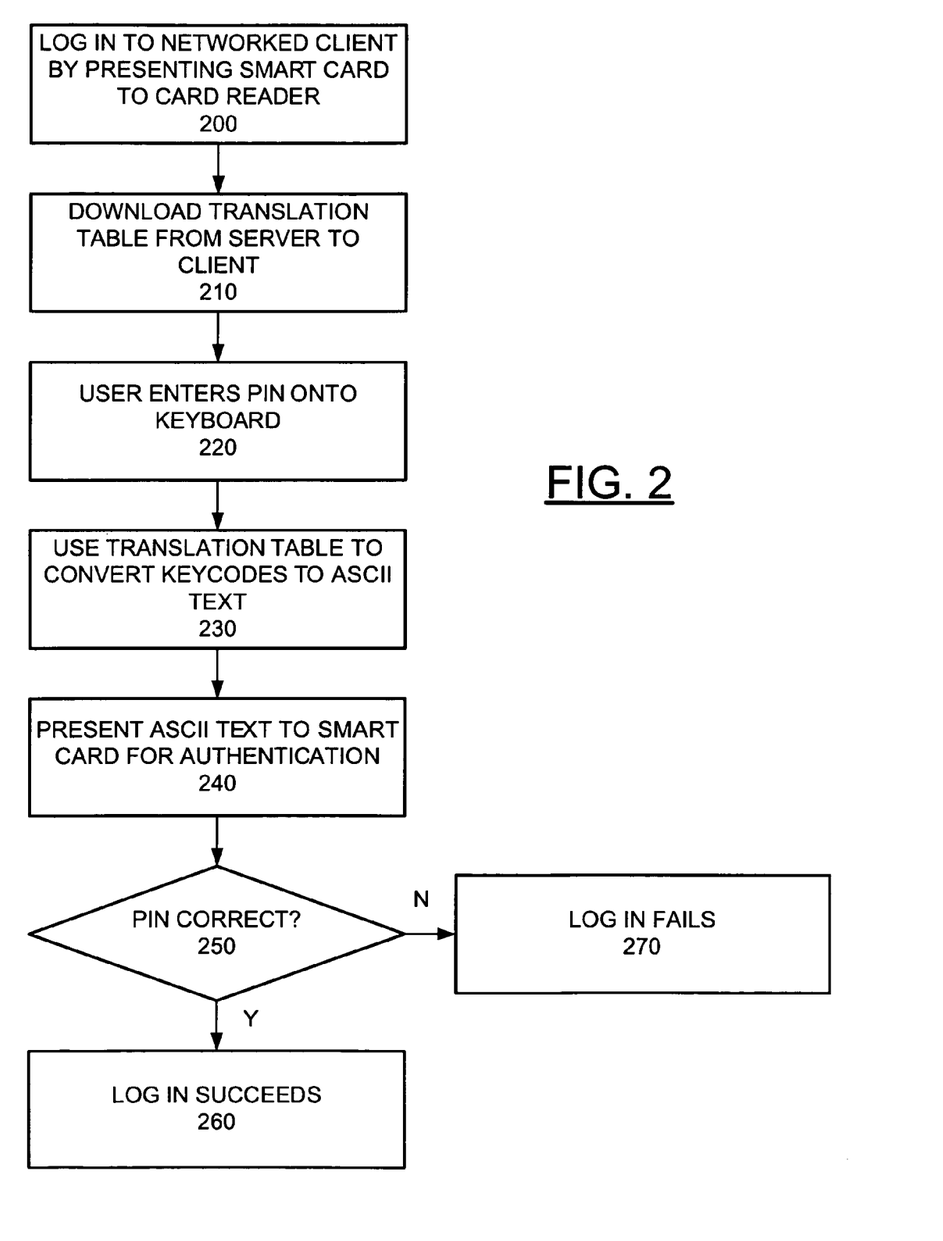
FIG. 2 shows dynamic downloading of keycode data according to an embodiment of the present invention.

One embodiment of the present invention is shown in FIG. 2. At step 200 a user logs into a networked client by presenting a smart card to a card reader attached to the client. At step 210, a translation table is downloaded from the server into the client. At step 220 the user enters a PIN into the keyboard. After the user enters the PIN, the client uses the translation table at step 230 to convert the keycodes to ASCII text. At step 240 the ASCII text is presented to the smart card for authentication. At step 250, it is determined whether the PIN is correct. If it is, the user is able to log in at step 260. Otherwise the log in fails at step 270.

Figure 3:
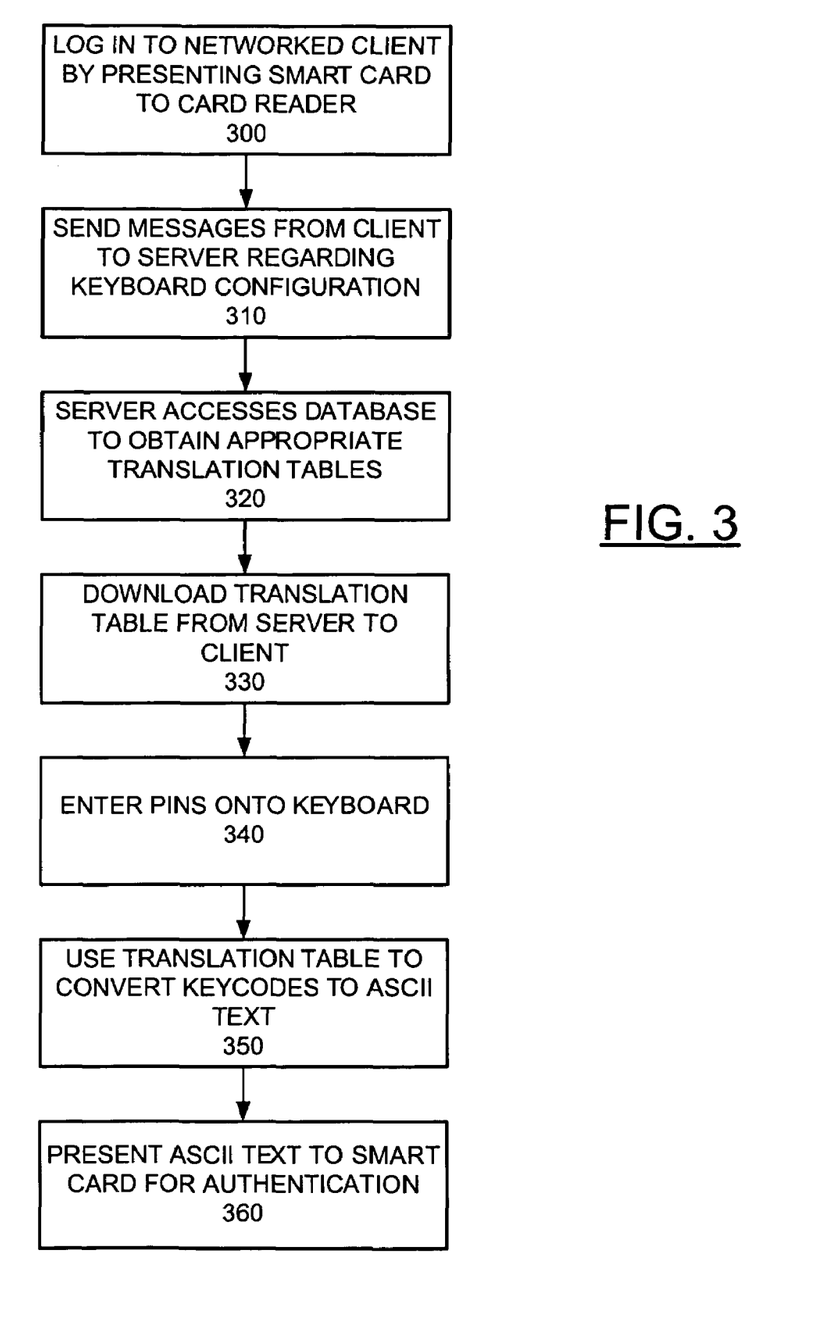
FIG. 3 shows dynamic downloading of keycode data according to another embodiment of the present invention.

Another embodiment of the present invention is shown in FIG. 3. In this embodiment, each networked computer connected to an input device contains the information necessary to instruct a server of the configuration of the input device and instructs the server at an appropriate time. At step 300 one or more users log into networked clients by presenting a smart cards to card readers attached to the clients. At step 310, each of the network clients sends a message to the server instructing it on the type of configuration for its input device (e.g., keyboard). Next at step 320, the server receives the message and accesses a database to obtain translation tables for each configuration.

At step 330 the translation tables are downloaded from the server into the clients. At step 340, the users enters PIN numbers into the keyboard. The client uses the translation table at step 350 to convert the keycodes to ASCII text and at step 360 the ASCII text is presented to the smart card for authentication.

Keycode Ranges

Figure 4:
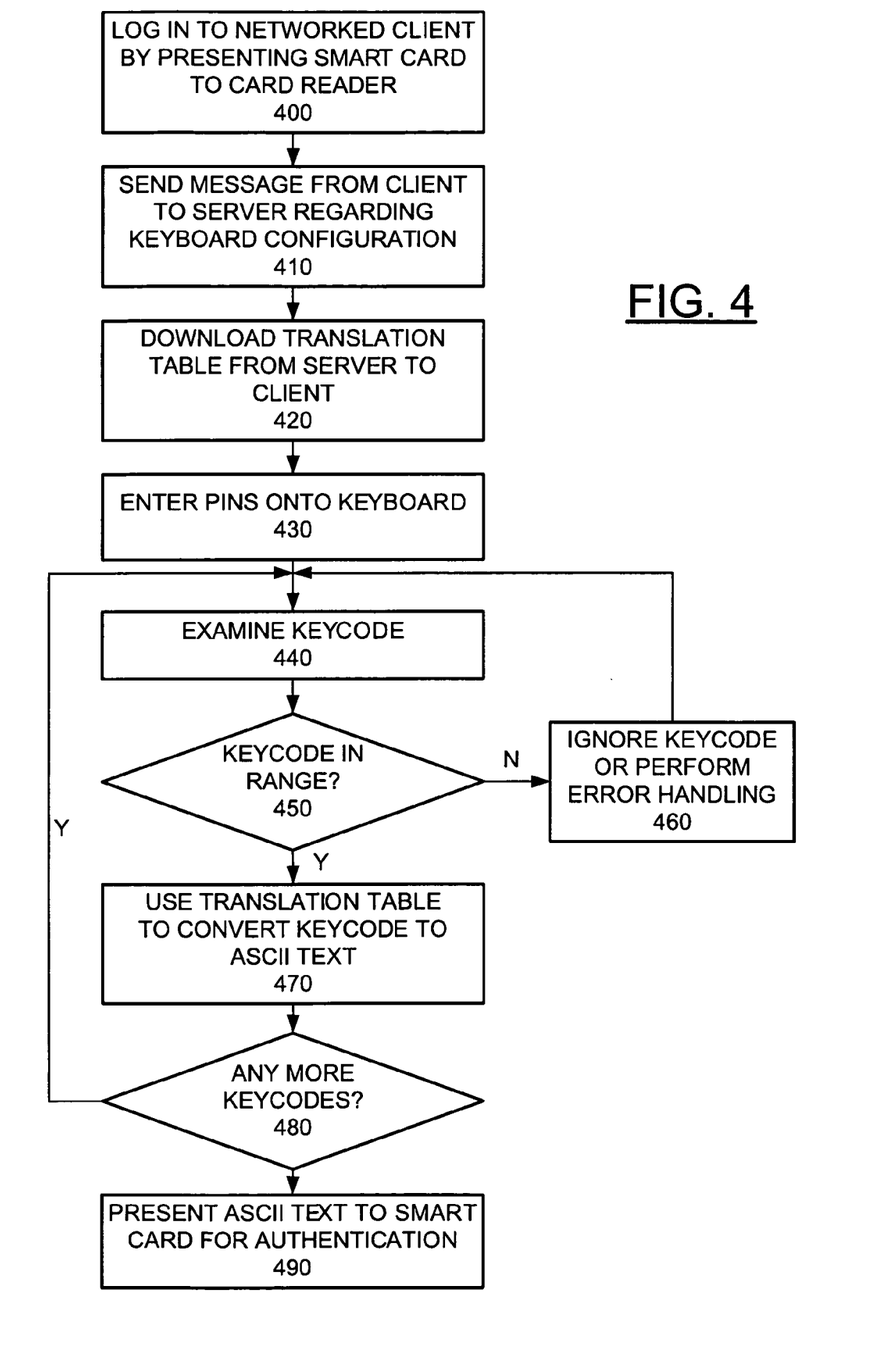
FIG. 4 shows dynamic downloading of keycode data using keyboard ranges according to an embodiment of the present invention.

In one embodiment, the server provides the client with a list and a range of valid keycodes that the client should process since not all keycodes are of interest to the client. This embodiment of the present invention is shown in FIG. 4. At step 400 a user logs into a networked client by presenting a smart card to a card reader attached to the client. At step 410, the client instructs the server to send a translation table for the current keyboard configuration. A translation table and a range of valid keycodes is downloaded from the server into the client at step 420.

At step 430, the PIN is entered. At step 440, the client examines a keycode. At step 450, it is determined whether the keycode is in range. If it is not, it is ignored at step 460 or an error handling routine is initiated before the process repeats at step 440. Otherwise, the client uses the translation table to convert the keycode to ASCII text at step 470. At step 480, it is determined whether there are any more keycodes. If there are, the process repeats at step 440. Otherwise, at step 490 the ASCII text is presented to the smart card for authentication.

Special Keycodes

Figure 5:
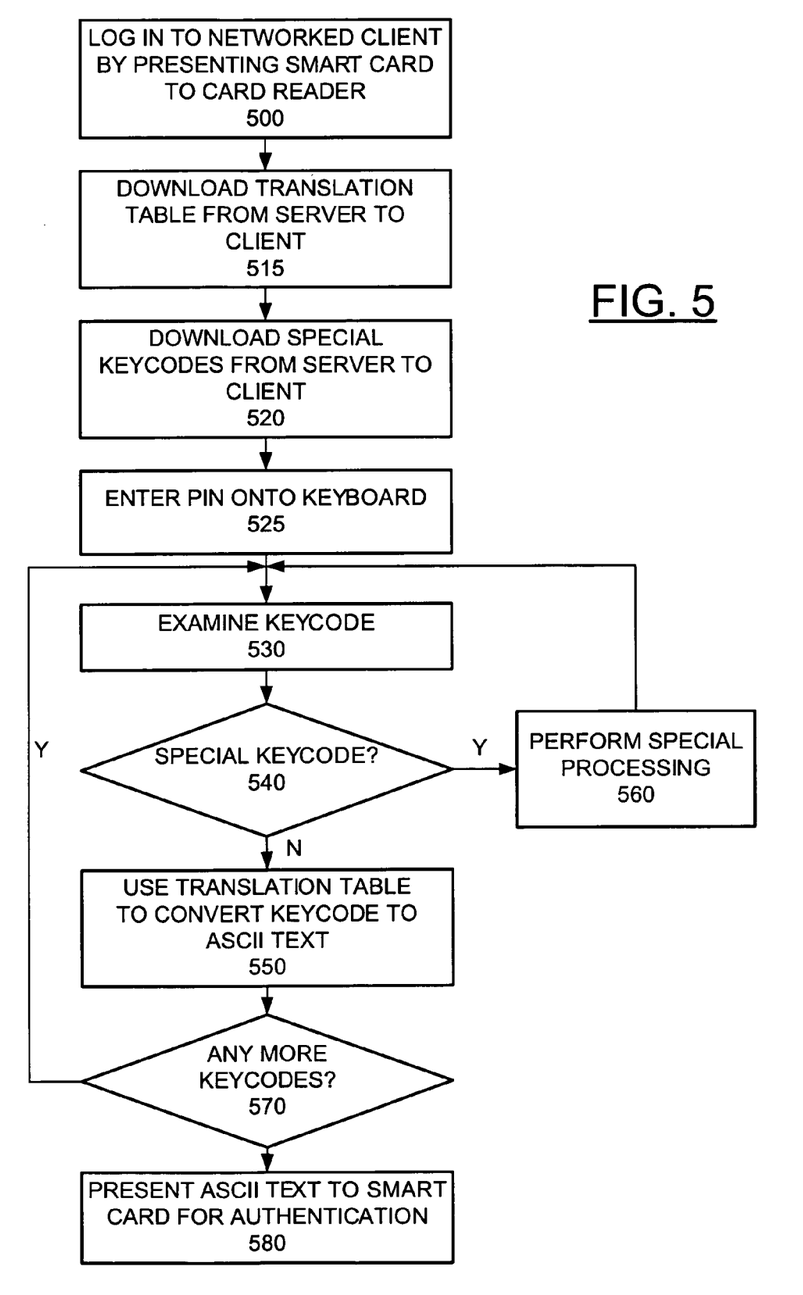
FIG. 5 shows dynamic downloading of keycode data using special keycodes according to an embodiment of the present invention.

In one embodiment of the present invention, a set of special keycodes are specified by the server in the keyboard translation table sent from the server to the client. The special keycodes include, for instance, "end of input", "delete previous character", and "abort operation". When one of the special codes is generated by the keyboard, the client performs special processing operations. This embodiment of the present invention is shown in FIG. 5.

At step 500 a user logs into a networked client by presenting a smart card to a card reader attached to the client. A translation table and a set of special keycodes are downloaded from the server into the client at steps 515 and 520 respectively. At step 525, the user enters the PIN which generates one or more keycodes. At step 530, the client examines a keycode. At step 540, it is determined whether the keycode is a special keycode. If it is not, the translation table is used by the client to convert the keycode to ASaI text at step 550.

Otherwise, the special keycode is used to perform a special processing operation at step 560 and the process repeats at step 530. Special processing operations include, for instance, deleting a character in a buffer or returning a special status code to the server to indicate that the current user input processing should be terminated. After step 550, at step 570, it is determined whether there are anymore keycodes. If there are, the process repeats at step 530. Otherwise, at step 580 the ASCII text is presented to the smart card for authentication.

Smart Card Architecture

Figure 6:
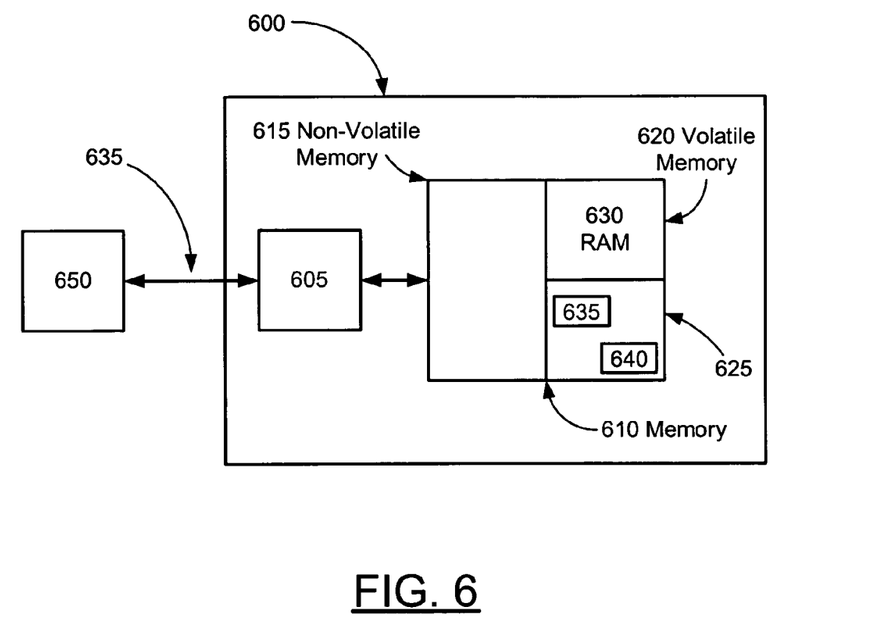
FIG. 6 shows an example of a smart card architecture.

FIG. 6 shows the architecture of one embodiment of a smart card that may be used with the present invention. The smart card 600 has a processor 605. This processor may be of limited capacity, such as an 8-bit processor, since the smart card's computational power is typically limited. The smart card has a memory 610 coupled to the processor which is divided up into non-volatile memory 615 and volatile memory 620. The volatile memory is further divided into EEPROM 625 and RAM 630. The EEPROM contains the operating program for the smart card 635 and other code 650, such as the code necessary to encrypt data and so on.

In one embodiment, the smart card has the ability to have software downloaded into its non-volatile memory where it can execute the program by moving it to RAM where the smart card will act according to the instructions of the computer software. The smart card further has a communications channel 635 between the processor and an external source 650 such as a host computer.

The processor in the smart card is configured to retain information within the smart card that is secret. For instance, a secret key in the smart card will never be divulged across the communications channel 635. The smart card will, however, allow information to come in across the communication channel and use the data. For instance, the smart card is configured to receive data from an external source across the communications channel, to use the secret key in the smart card (i.e., PIN, for example to sign and encrypt the incoming data, and to send the results out along the communications channel 635 to the external source 640.

Keycode Translation Table Formats

In one embodiment, the client sends a message to the server whenever the client needs a keyboard translation table. The client sends a message consisting of a keyboard translation table request. Table 1 shows an example of one embodiment of a keyboard translation table that is returned from such a request.

TABLE 1

| type | country | instance |
| --- | --- | --- |

Table 1 comprises one or more keyboard translation table triples. Type refers to the type of keyboard. Country refers to the country associated with the keyboard. Instance refers to the ASCII representation that corresponds to the keycode.

One embodiment of the invention uses HexDump format. This format is a human readable 2 byte ASCII representation of 1 binary byte. Literally any of the 2 bytes concatenations generated by choosing two characters from the following:

'0', '1', '2', '3', '4', '5', '6', '7', '8', '9', '0', 'A', 'B', 'C', 'D', 'E', 'F',

Using this scheme, the decimal value 131 is represented as "59".

Keyboard intervals are used as a compact way to represent a consecutive range of USB keycodes (or any code that represents a key on a keyboard). One or more repetitions of the construct:

<keycode>['-' <keycode>] ';' (definitions surrounded by square brackets are optional.

<keycode> is specified in HexDump format and the value on the left of the range should be numerically lower than the number on the right of the range (it is an interval).

In one embodiment, "keytable download" is a command (CIRL) for downloading a keytable (KT) to the firmware and follows this syntax:

CIRL=KT KT=Keyboard spec>_<Special characters>_<keycodes>_<Keymap>

The underscore is used as a separator between elements.

The <Keyboard spec> is a 3 bytes long combination expressed in Hexdump values whose first byte is keyboard type, the second is the keyboard index, and the third is the country code. A US type Sunray keyboard has a keyboard type set to "06", the keyboard index is "00", and the countrycode for the US is 33 (decimal). In HexDump the 33 translates to "21". Thus, the keyboard spec for this keyboard is "060021".

The <Special characters> is a string defining the USB keycodes to be used for the ENTER, ESCAPE, and BACKSPACE characters, in the following format:

<kc>[<kc> . . .]@E<kc>[<kc> . . . ]@B<kc>[<kc> . . . ]@Q where E means ENTER, B means BACKSPACE, Q means ESCAPE. All three specifications should be present, and for each one or more keycodes should be specified. Keycodes are expressed in the HexDump values as above.

The US keyboard of the example is specified as:

2858@E2A4C@B29@Q

"28 and "58" are keycodes for keyboard enter and keypad enter for ENTER

"E2" and "A4" are keycodes for keyboard backspace and delete, keypad delete for BACKSPACE "29" is a keycode for keyboard escape for ESCAPE.

The <keycodes> specify the keyboard keycodes to be used to enter a PIN. Keycodes are specified as keyboard intervals as described above.

The example US keyboard could be specified as:

04-27:2B-38:54-57:59-63:64:

The <Keymap> is a string that defines the characters to be used when translating USB keycodes to characters. Each character is specified in HexDump value, as defined above. Since a key meaning can be modified by the use of modifiers, like SHIFT/CONTROL, the keymap has to specify what happens if one of these has been pressed. For each keycode there should be three characters in the keymap, representing normal character, SHIFT-key character, and CONTROL-key character.

The <Keymap> length is defined by the total numbers of keycodes specified as in <keycodes> multiplied by three. No separator is specified between different parts.

For the example keyboard, keycodes defined as '2B-38:54-57:' in the US keymap are defined as:

"0909092020202D5F303D2B305B7B305D7D305C7C30237E303B3A30272230607E
302C3C302E3E302F3F302F2F2A2A2A2D2D2D2B2B2B"

Smart Card Reader Protocol

The protocol makes use of a device manager/remote device driver (DM/RDD) layer as transport mechanism. When the host wants to communicate with the smartcard, the EXCHANGE primitive is used, and the transfer of data follows these rules:

a) Commands are specified as "CMD=xxx" as header of the string.

b) All parameters, if any, follow in the string.

c) Each parameter is a key/value pair.

Not all operations are atomic, for example changing the PIN on a card could require asking for the old PIN, the new PIN and a second copy of the PIN as confirmation. Only if the two copies match will the APDU for writing the new PIN on the card be sent. All the while, the user may want to do other things. To address this, a small "language" is defined. All commands are atomically and sequentially executed, no two commands are in execution at the same time.

One feature is to type a PIN without sending it to the Host, but directly to the smartcard, in a sort of loopback mode. Again, this is not always possible right away, so we need a way to type a PIN and temporarily store it until it can be embedded in an APDU to the card. Some operations, like entering/exiting the loopback keyboard mode and downloading the keymaps, are accomplished via control callback.

Typical operation requires the service to enter secure mode, download a keytable, and operate. In case a keytable has not been specified, some commands cannot execute, notably READ, CMP, APDU. The latter is a special case, since an APDU could be sent to the card independently of Secure Mode. In that case the keytable error is generated when reference to a buffer is made in the APDU itself.

An LED near the smartcard reader will blink according to the following rules as described by the Sun Service Indicator Standard which covers user-visable indicators on Sun platforms:

No LED activity

There is no readable card in the reader.

Green LED blinking

While in Secure PIN Entry Mode the blink rate should be 3–5 Hertz at a 50% on, 50% off duty cycle for the duration that the mode is active.

While data is being exchanged with the card, the LED shall flash at a random or intermittent rate for no less than 1 full second with the LED ending in the lit state.

Green LED fully lit

The smart card has been read and is ready (i.e. The card is still able to be accessed).

There is another primitive available via RDD, CONTROL. This call is used to initiate/terminate Secure PIN Entry Mode, download the keytable and to signal cancellation of an operation.

For operations to be successfully carried on, the DM notification facilities are used to tell the DM service about card properties, keyboard attached to the unit and keypresses. These internal properties are embedded in a message in the format described below.

Key/value Description for EXCHANGE
   A sample transaction could be:
   Host                     DTU
   "CMD=APDU APDU=00B0000008"
                "RES=760833EF PB=60 STATUS=9000"
   (values random)
   Where I asked for a certain APDU to be sent to the card and the
   result is sent back along with the procedure bytes and status.
   All described parameter and return keys have a
       <Key>=<value> syntax.
   CMD=      Description and values
   APDU      Asks for a certain APDU to be sent to the card.

-continued

```
Parameters:
  Key
    APDU      APDU's bytes as an HexDump string. Buffers are
              referred to by 'X' for buffer 0, 'Y' for buffer 1
              'Z' for buffer 2. Each buffer specification is
              prepended by 'P'. a byte specified as "PP" means
              a pad byte.
              For more information, see APDUpatterns.txt
              'L' means substitute the apdu lenght.
    This pair is mandatory.
    FP        specifies in HexDump format the byte to use as pad
    This pair is optional.
  Returns:
    Key
      RES     the hexdump bytes from the card
      PB      procedure bytes
      STATUS  the status bytes
    All return pairs are mandatory unless an error has occurred
  READ        reads a series of keystrokes from the keyboard
    Parameters:
      Key
        BN    The number of the buffer where henceforth
              keycodes will be stored. 'S' will be used
              to signal "stop buffering keycodes"
        EP    Specifies options to report keypresses.
              Default behaviour is to report keypresses
              belonging to the downloaded keytable only.
              Values for this keyword are as follows:
                KS  Does not send notifications back on keys
                    presses for any key except Enter,
                    backspace and escape
                NP  Sends a notification each time a key not
                    belonging to the specified key-table
                    has been pressed
        This pair is optional.
    Returns:
      Key
        READ  the current buffer number.
  CMP   compares two the translated keycode buffers
    Parameters:
      Key
        BN1   first buffer number
        BN2   second buffer number
      Example:
        CMD=CMP BN1=0 BN2=1
      Returns:
        Key
          CMP   "1" is ther is a match. "0" no match.
        Exactly one of the two pair is acceptable.
  CLR   clears a buffers.
    Parameters:
      Key
        BN    a buffer number
      If absent all buffers are cleared.
      Example:
        CMD=CLR BN=1
    Returns:
      Key
        CLR   "OK".
  PAUSE  Suspends keyboard loopback mode.
    No input parameters.
    Returns:
      Key
        PAUSE   "OK".
  RESUME  Re-enters keyboard loopback mode.
    No input parameters.
    Returns:
      key
        RESUME  "OK".
Error codes for EXCHANGE
```

Some error return values are defined for cases in which parameters do not comply with the protocol. So instead of the return keyvalue pairs described above, a keypair ERR= < . . . > is returned with the following values defined:

```
ERR= Description
  NOKT    No keytable is present. command cannot continue.
  PE      In case the command is not recognized, or general
          parsing error.
  NB      No buffer number has been specified in a READ
          command.
  WB      An illegal buffer number has been specified.
          one or more BN=xx keypairs will specify which
          buffer number is illegal.
  MB      in case of a CMP command, one buffer number has
          not been specified.
  NO      The unit is not operating in Secure Pin entry mode.
Key/value Description for CONTROL
A sample transaction could be:
Host        DTU (Desk Top Unit)
"CTRL=ON"
            "KT=060021"
    An attempt has been mad to enter Secure PIN ENtry Mode, and the
unit sent back the Keytable necessary for entering a PIN.
  All described parameter and return keys have a <Key>=<value> syntax.
  CTRL=     Description and values
  ON        Enter Secure PIN Entry Mode (this is also referred
            to as "loopback mode").
    Parameters:
      (none)
    Returns:
      Key
        KT   Required Keytables, See KeytableDownloadFormat.txt
             for more information.
  OFF     Exit Secure PIN Entry Mode
    Parameters:
      (none)
    Returns:
      (none)
```

```
                          -continued

KT        Downloads a Keytable
                        Parameters:
                            Key
                            KT    a keytable specification, as described in
                                  KeytableDownloadFormat.txt
                        Returns:
                            (none)
INT       Interrupts the current operation
          Parameters:
              (none)
          Returns:
              (none)
Error codes for CONTROL
    With the exception of CTRL=ON, CONTROL messages do not use the channel
to send results back, but set the return message return value as follows
    UT_SUCCESS    Command completed ok.
    UT_FAILURE    Keytable download did not succeed. Bad KT=syntax
    UT_ACCESS     Could not enter Sesure PIN Mode.
    UT_EIO        Cannot interrupt current operation.
                  Keytable download did not succeed. not in Secure PIN entry
                  Mode
    UT_NOTSUP     Wrong command
DM messages
    Messages to the DM have the following DM format:
sc.props=<SCBus properties>
<SCBus properties> follow a format similar to the key/value pairs as
descrbied before, but since they are embedded in a more general framework,
values are separated from keys by a ':' instead of '=' and pairs are
separated by '_' instead of spaces.
A property is always present, "sc.sn" a serial number assuming values
from 0 to 255, in HexDump format.
Example:
device term=IEEE802.080020f56dc7 bus=sc addr=smartcard\
    sc.props=sc.sn:03__sc.kbd:060021
reports a USB type 6 keyboard, US keymap.
<SCBus properties>
    sc.       Description
    sn        Internal serial number.
    kbd       Reports keyboard suitable for downloading a keytable
              via CTRL=KT. it is keyboard spec that appears in that control
    keypress  Reports a keypress notification. Possible values are:
              '*'   a character belonging to the PIN has been pressed
              'E'   ENTER has been pressed
              'Q'   ESCAPE has been pressed
              'B'   BACKSPACE has been pressed
              'N'   a character not belonging to the PIN has been pressed
    status    Tells SmartCard reader status. Values:
              in    a smartcard is in the reader or recognized
              out   a smartcard is not present or has been removed
    atr       Reports the SmartCard ATR in HexDump format
    atr.hs    ATR History, HexDump format.
```

Virtual Desktop System Architecture

Figure 7:
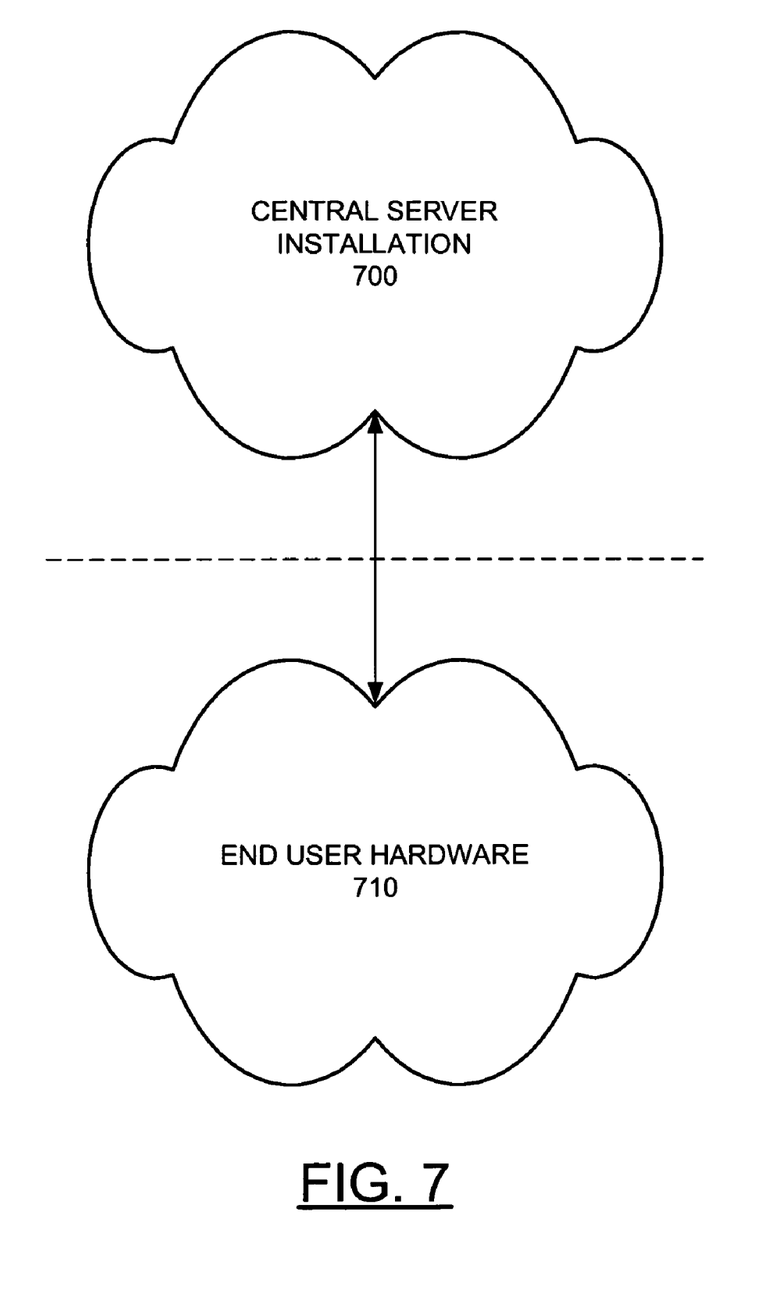
FIG. 7 shows an example of a thin client topology called a virtual desktop system architecture.

FIG. 7 shows an example of a thin client topology called a virtual desk-top system architecture. The virtual desktop system architecture provides an example of a computer architecture where embodiments of the present invention have specific applicability. The architecture provides a re-partitioning of functionality between a central server installation 700 and end user hardware 710. Data and computational functionality are provided by data sources via a centralized processing arrangement. At the user end, all functionality is eliminated except that which generates output to the user (e.g., display and speakers), takes input from the user (e.g., mouse and keyboard) or other peripherals that the user may interact with (e.g., scanners, cameras, removable storage, etc.). All computing is done by the central data source and the computing is done independently of the destination of the data being generated. The output of the source is provided to a terminal, referred to here as a "Human Interface Device" (HID). The HID is capable of receiving the data and displaying the data.

Figure 8:
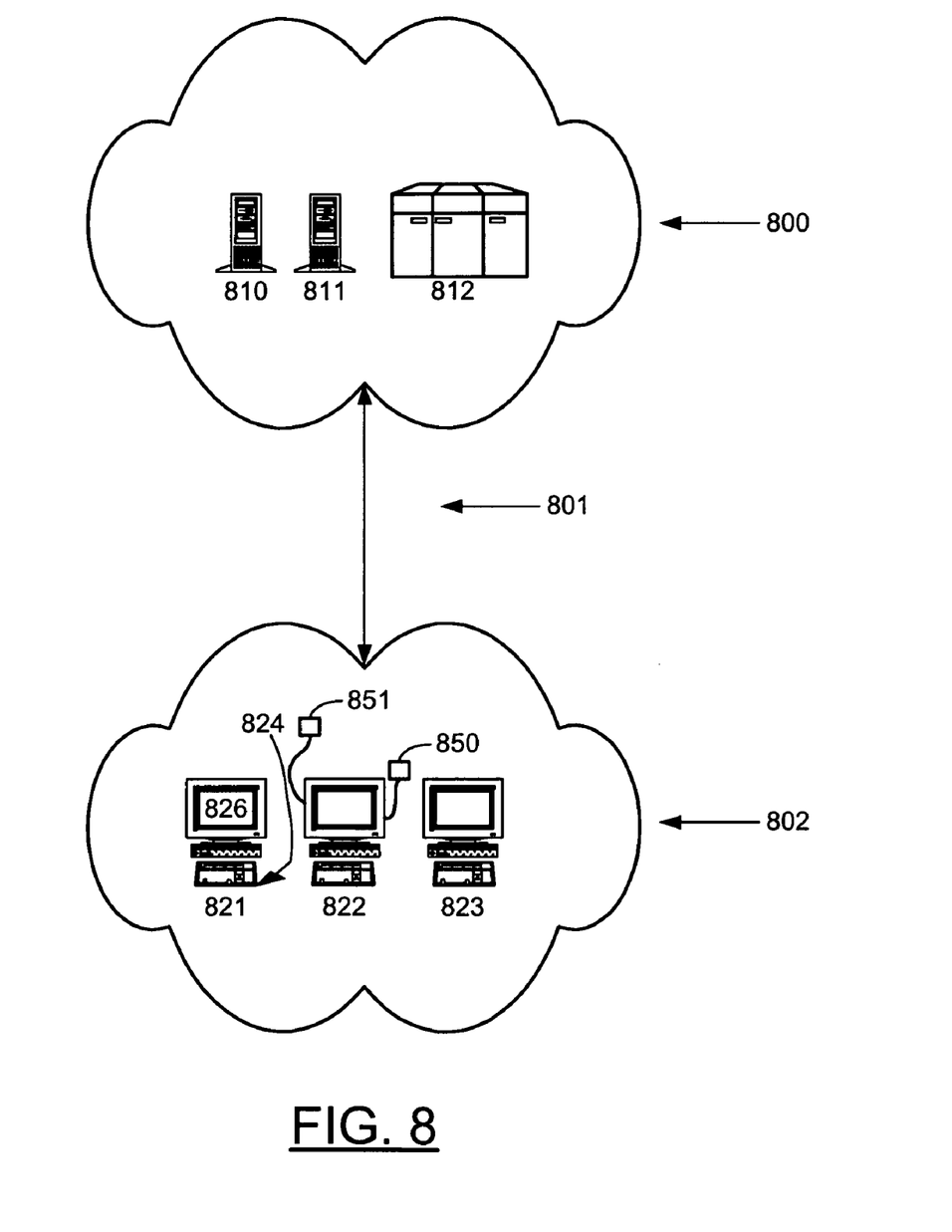
FIG. 8 displays the partitioning of the functionality of the virtual desktop system architecture.

The functionality of the virtual desktop system is partitioned between a display and input device such as a remote system and associated display device, and data sources or services such as a host system interconnected to the remote system via a communication link. The display and input device is a human interface device (HID). The system is partitioned such that state and computation functions have been removed from the HID and reside on data sources or services. One or more services communicate with one or more HIDs through a communication link such as network. An example of such a system is illustrated in FIG. 8, wherein the system comprises computational service providers 800 communicating data through communication link 801 to HIDs 802.

The computational power and state maintenance are provided by the service providers or services. The services are not tied to a specific computer, but may be distributed over one or more traditional desktop systems such as described in connection with FIG. 8, or with traditional servers. One computer may have one or more services, or a service may be implemented by one or more computers. The service provides computation, state and data to HIDs and the service is under the control of a common authority or manager. In FIG. 8, the services are provided by computers 810, 811, and 812. In addition to the services, a central data source can provide data to the HIDs from an external source such as for example the Internet or world wide web. The data source can also be broadcast entities such as those that broadcast data (e.g., television and radio signals).

Examples of services include X11/Unix services, archived or live audio or video services, Windows NT service, Java™ program execution service and others. A service herein is a process that provides output data and response to user requests and input. The service handles communication with an HID currently used by a user to access the service. This includes taking the output from the computational service and converting it to a standard protocol for the HID. The data protocol conversion is handled by a middleware layer, such as the X11 server, the Microsoft windows interface, video format transcoder, the OpenGL® interface, or a variant of the java.awt.graphics class within the service producer machine. The service machine handles the translation to and from a virtual desktop architecture wire protocol described further below.

Each service is provided by a computing device optimized for its performance. For example, a machine, such as an Enterprise class machine, may be used to provide X11/Unix service, a Sun MediaCenter™ may be used to provide video service, a Hydra based NT machine may provide applet program execution services. The service providing computer system can connect directly to the HIDs through the interconnect fabric. It is also possible for the service producer to be a proxy for another device providing the computational service, such as a database computer in a three-tier architecture, where the proxy computer might only generate queries and execute user interface code.

The interconnect fabric can comprise any of multiple suitable communication paths for carrying data between the services and the HIDs. In one embodiment the interconnect fabric is a local area network implemented as an Ethernet network. Any other local network may also be utilized. The architecture also contemplates the use of wide area networks, the Internet, the world wide web, and others. The interconnect fabric maybe implemented with a physical medium such as a wire or fiber optic cable, or it may be implemented in a wireless environment.

The interconnect fabric provides actively managed, low-latency, high-bandwidth communication between the HID and the services being accessed. One embodiment contemplates a single-level, switched network, with cooperative (as opposed to completing) network traffic. Dedicated or shared communications interconnects may also be used.

The HID is the means by which users access the computational services provided by the services. FIG. 8 illustrates HIDs 821, 822 and 823. Each HID comprises a display 826, a keyboard 824, mouse 851, and audio speakers 850. The HID includes the electronics need to interface these devices to the interconnection fabric and to transmit to and receive data from the services.

Figure 9:
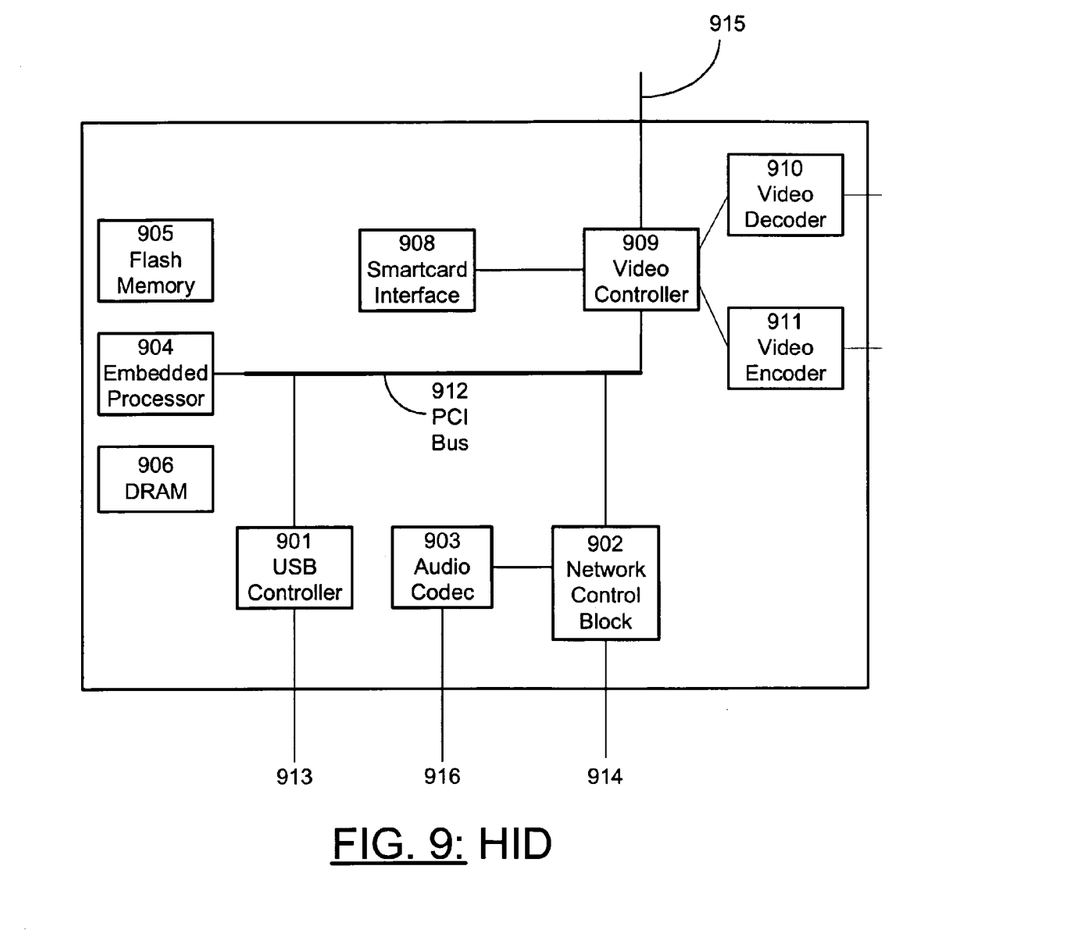
FIG. 9 is a block diagram of an example embodiment of a human interface device.

A block diagram of an example embodiment of the HID is illustrated in FIG. 9. The components of the HID are coupled internally to a bus 912. Network control block 902 communicates to the interconnect fabric, such as an Ethernet, through line 914. An audio code 903 receives audio data on interface 916 and is coupled to network control block 902. Universal senal bus (USB) data communication is provided on lines 913 to a USB controller 901. The HID further comprises a embedded processor 904 such as a Sparc2ep processor with coupled flash memory 905 and dynamic random access memory (DRA4 906. The USB controller 901, the network control block 902 and the embedded processor 904 are all coupled to the internal bus 912. A video controller 909, also coupled to the internal bus 912, can include an AIT RagePro+frame buffer controller which provides. Super video graphics array (SVGA) output on the line 915. National television standards committee (N qSC) data is provided in and out of the video controller through video decoder 910 and encoder 911 respectively. A smartcard interface 908 may also be coupled to the video controller 909.

Figure 10:
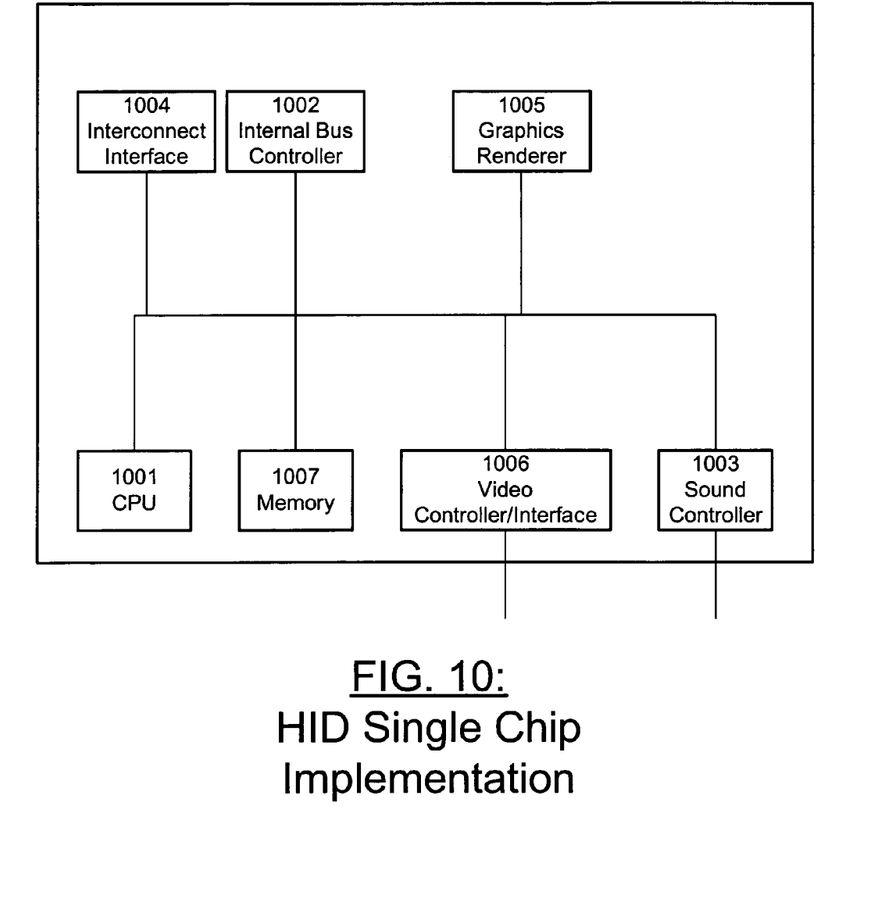
FIG. 10 is a block diagram of a single chip implementation of a human interface device.

Alternatively, the HID can comprise a single chip implementation as illustrated in FIG. 10. The single chip includes the necessary processing capability implemented via CPU 1001 and graphics renderer 1005. Chip memory 1007 is provided, along with video controller/interface 1006. A internal bus (USB) controller 1002 is provided to permit communication to a mouse, keyboard and other local devices attached to the HID. A sound controller 1003 and interconnect interface 1004 are also provided. The video interface shares memory 1007 with the CPU 1001 and graphics renderer 1005. The software used in this embodiment may reside locally in on-volatile memory or it can be loaded through the interconnection interface when the device is powered.

The operation of the virtual desktop system architecture is described in co-pending U.S. patent application Ser. No 09/063,335, filed Apr. 20, 1998, entitled "Method and Apparatus for Providing A Virua Desktop System Architecture" and assigned to the present assignee, and incorporated herein by reference.

Thus, the dynamic downloading of keyboard keycode data to a networked client is described in conjunction with one or more specific embodiments. Me invention is defined by the claims and their full scope of equivalents.

The invention claimed is:

1. A method for verifying a personal identification number (PIN) comprising:
   downloading into a client a keycode translation table;
   receiving one or more key entries from a user interface device in communication with the client, each of the key entries generating a keycode within the client;
   using said keycode translation table to convert said key entries to one or more encoded characters;
   presenting said encoded characters to said smart card; and
   using said encoded characters in said smart card to verify said PIN.

2. The method of claim 1 further comprising:
   sending an instruction from said client to a server requesting said keycode translation table.

3. The method of claim 1 wherein said keycode translation table includes a keyboard translation table triple.

4. The method of claim 3 wherein said keyboard translation table triple includes a type, a country, and an instance.

5. The method of claim 1 wherein said client and said server comprise a virtual desktop system architecture.

* * * * *